April 12, 1927. Re. 16,590

C. G. OLSON ET AL

HOB GRINDING MACHINE

Original Filed Feb. 7, 1919 4 Sheets-Sheet 1

Inventors.
Carl G. Olson
Frank W. England
By Cheever & Cox
Attys.

April 12, 1927. Re. 16,590

C. G. OLSON ET AL

HOB GRINDING MACHINE

Original Filed Feb. 7, 1919 4 Sheets-Sheet 2

Inventors
Carl G. Olson
Frank W. England
By Cheever & Cox Atty's

April 12, 1927. C. G. OLSON ET AL Re. 16,590

HOB GRINDING MACHINE

Original Filed Feb. 7, 1919 4 Sheets-Sheet 3

Inventors.
Carl G. Olson
Frank W. England
By Cleaver & Cox Attys.

April 12, 1927. Re. 16,590

C. G. OLSON ET AL

HOB GRINDING MACHINE

Original Filed Feb. 7, 1919 4 Sheets-Sheet 4

Inventors:
Carl G. Olson
Frank W. England
By Cleaver & Cox
Attys.

Reissued Apr. 12, 1927. Re. 16,590

UNITED STATES PATENT OFFICE.

CARL G. OLSON AND FRANK W. ENGLAND, OF CHICAGO, ILLINOIS, ASSIGNORS TO ILLINOIS TOOL WORKS, OF CHICAGO, ILLINOIS, A CORPORATION OF ILLINOIS.

HOB-GRINDING MACHINE.

Original No. 1,383,843, dated July 5, 1921, Serial No. 275,537, filed February 7, 1919. Application for reissue filed April 22, 1924. Serial No. 708,319.

Our invention relates to machine tools, and is particularly applicable to hob grinding machines and similar relieving machines in which it is required that there be frequent relative movement between the tool and work in a radial direction, that is, toward and from the axis of the work. In the accompanying drawings, we have shown a grinding wheel acting upon the teeth of a hob. The grinding tool revolves about a stationary axis and the machine is so constructed as to move the hob toward and from the work for producing the necessary relief upon the hob. The work holder or spindle moves rotatively, axially and transversely, thus having three kinds of movement, but the bearings in which it is mounted are non-traveling, thus reducing the weight of the parts which must be moved lengthwise of the work spindle. The bearings for the work spindle are in the form of a rocking frame oscillatable in a plane transversely to the axis of the work spindle. The work spindle is caused to travel axially by a lead screw having the same pitch as the lead of the hob, and this lead screw is co-axial with the work spindle, as a result of which, the pulling force which moves the work spindle axially is substantially in line with the resistance—that is, the point of application of the grinder to the work. Means are also provided for reversing the position of the tool relatively to the work. Means are also provided whereby the work may be returned to its original position so that a fresh operation may be performed without disturbing the relationship between the angular position of the work and its radial position, that is, its distance from the grinder. For this purpose the work is mounted in a rocking frame, the frame is rocked by a cam, the cam is geared to the work spindle and a ratchet having the same number of teeth as there are rises in the cam is included in said gearing. In the case illustrated the ratchet has one tooth and the cam a single rise.

The object of our invention is to produce a machine having one or more of the foregoing characteristics and to produce the various combinations and sub-combinations by which the results may be obtained.

To explain the invention, we have chosen to illustrate it in a form adapted for the grinding of hobs, and in the accompanying drawings, Figure 1 is a front elevation partly in section of the complete machine.

Like numerals denote like parts throughout the several views.

Figure 3:
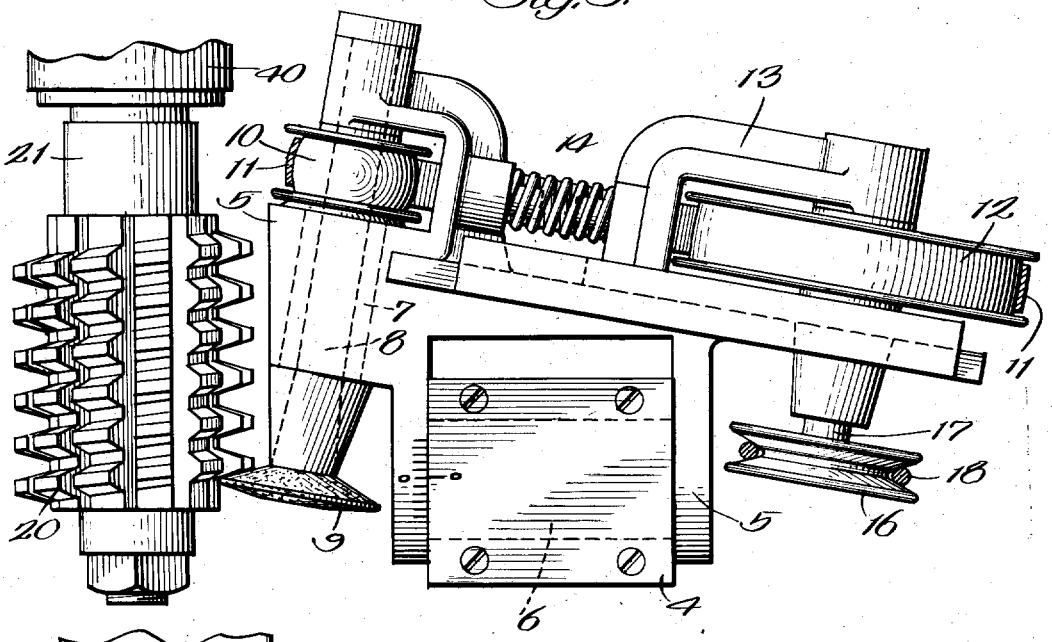
Figure 3 is a top plan view of the hob, tool and tool holder.

In the form selected to illustrate the invention, the machine has a main frame or bed 1 on which a table 2 is longitudinally slidable. A table 3 is transversely slidable upon table 2 and carries near the rear end a post 4. A tool holding frame or tool carrier 5 is pivoted to the upper end of post 4 by means of a pin 6 or equivalent device. In said frame there is journaled a spindle 7, shown in dotted lines in Figure 3. Said spindle is adapted to take the arbor 8 of the grinding tool 9. The spindle is driven by a pulley 10 which, in turn, is driven by a belt 11. The belt is driven by a pulley 12 journaled in a yoke 13 which is slidably mounted on frame 5 so as to enable it to move toward and from the pulley 10. A helical compression spring 14 tends to force the pulleys apart and thus keep the belt tight. Pulley 12 is driven by a sheave 16 fastened to the same shaft 17 as supports the pulley 12. Power to drive the sheave is derived from a belt 18 driven from a suitable power device overhead (not shown).

The hob 20, which constitutes the work in the present case, is mounted on a work spindle 21, sometimes called "the work-holder". It will be noted that the axis of the tool spindle is inclined relatively to the axis of the work spindle. This is to compensate for the helix angle of the hob. It also gives more room for the spindle driving mechanism when a small grinding wheel is used. The pin 6 which forms a pivot for the tool carrying frame 5 is arranged approximately at right angles to the axis of the work spindle 21; consequently, by throwing the frame over—that is, rotating it about its axis—the position of the grinding wheel will be reversed, thus enabling the wheel to act upon the opposite side of the hob teeth.

Figures 1, 7:
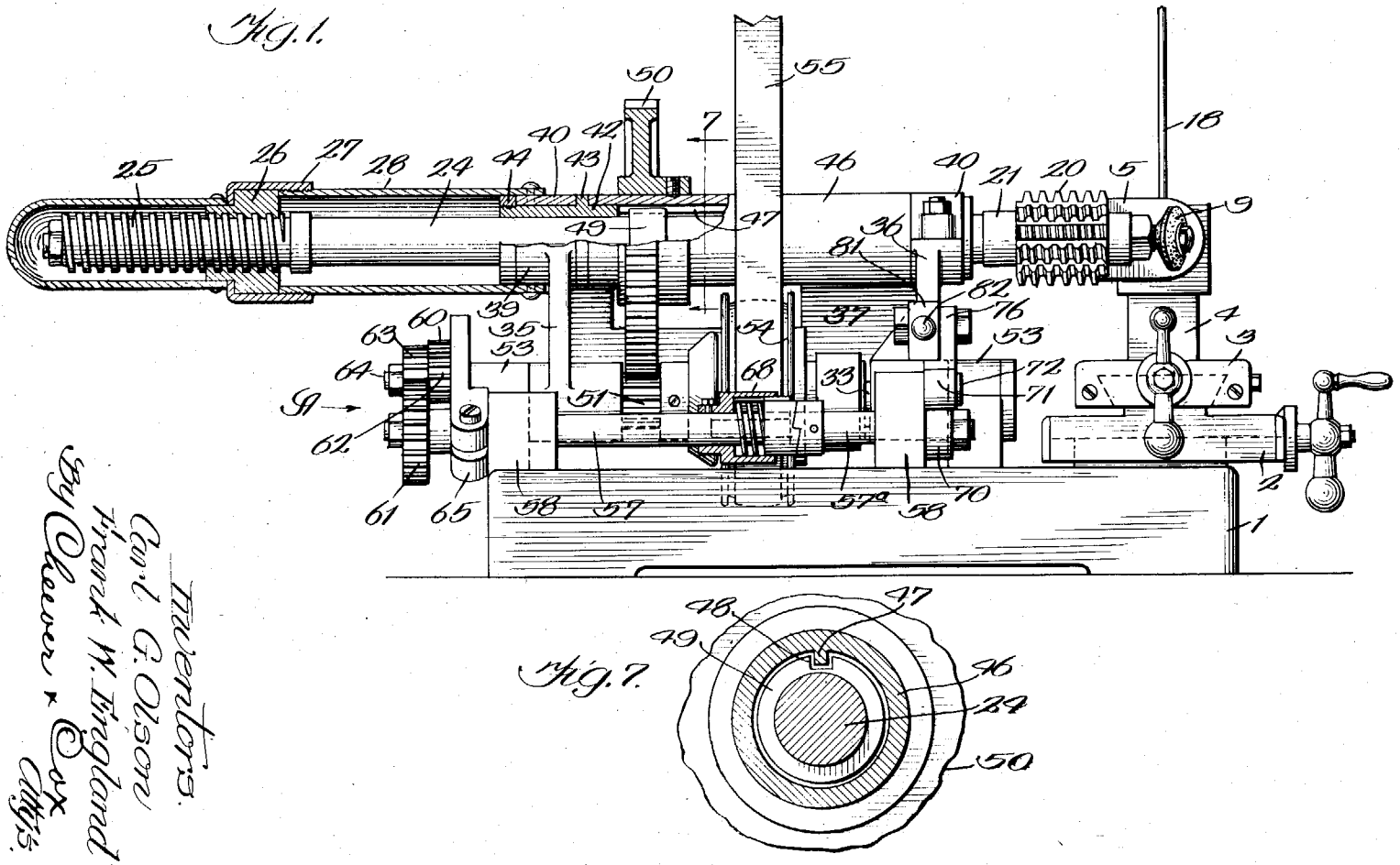
Figure 7 is a vertical sectional view on the line 7—7 Figure 1.

The work spindle 21, above mentioned, has an extension 24, best shown in Figure 1. It has a lead screw 25 at the outer end which has the same pitch as the helical lead of the teeth in the hob and works in a nut 26, supported in a cap 27 screwing onto the end of the housing 28. The housing, cap, and nut are stationary so far as longitudinal movement is concerned, and hence as the spindle rotates the work will be advanced longitudinally. In order to keep the lead screw and nut dust proof, it is desirable to place a cap 30 over the outer end of the screw. According to the present design the cap is fastened to and supported by the nut.

Figure 5:
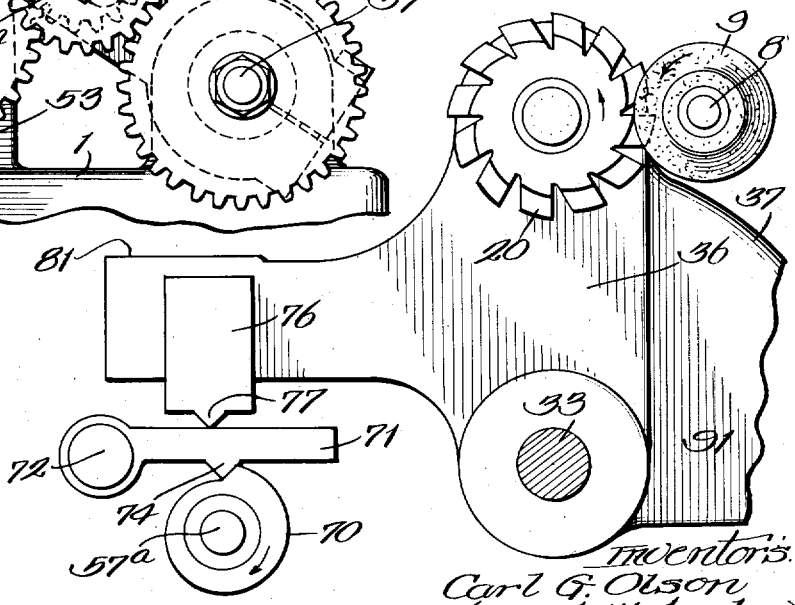
Figure 5 is a view, more or less diagrammatic, showing the work holder, its support, and the cam mechanism which actuates it.
Figure 6:
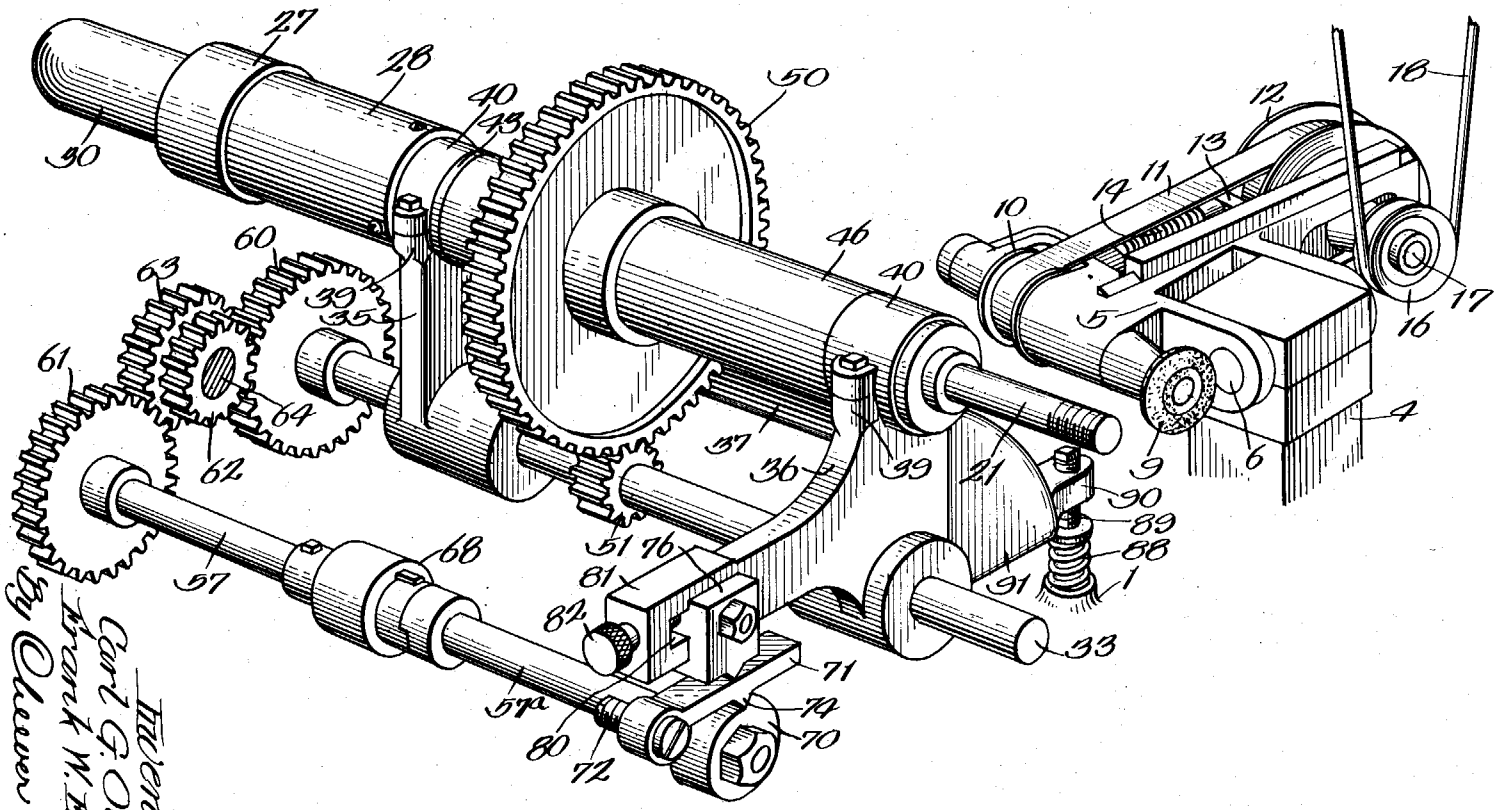
Figure 6 is a perspective view showing some of the more essential portions of the machine, so far as our invention is concerned.

The work spindle and associated parts are carried at the upper end of a rocking frame which is shown in perspective in Figure 6, and more or less diagrammatically in Figure 5. This frame is fulcrumed upon a shaft 33 and consists chiefly of the two arms 35, 36 connected by a cross brace 37. At the upper ends the arms 35, 36 have pillow blocks 39 provided with caps 40. These blocks and caps constitute journal bearings for the rotating parts. In the bearing at the left, best shown in Figure 1, a sleeve 42 is inserted and this encircles and supports the spindle 24. The sleeve has a collar 43 which abuts one end of the cap, and a screw collar 44 which abuts the other end of the cap and holds the sleeve against longitudinal movement. In the particular form shown, the housing 28 is fastened by screws or otherwise to the blocks 39 and cap 40 at the left.

The mechanism for rotating the spindle and at the same time causing it to travel longitudinally includes a rotatable sleeve 46 which is journaled at one end upon the sleeve 42 and has an internal feather 47 which projects into a slot 48 formed in a collar 49 fastened to or forming an integral part of spindle 24, as shown in detail in Fig. 7. Said feather extends parallel to the spindle axis and hence drives the spindle but at the same time permits it to travel longitudinally. Sleeve 46 is driven in the present instance by a spur gear 50, driven by a pinion 51 fastened to the shaft 33, above mentioned. Said shaft is journaled in bearings 53, 53 rising from the stationary bed 1 and is driven by a pulley 54, as best shown in Figure 1. In practice said pulley is not rigidly fastened to the shaft, but is connected to it through reversing transmission mechanism adapted to drive the shaft at a relatively slow speed forward, and relatively high speed backward. Reversible transmissions suitable for the purpose are well known and consequently need not be here described in detail. Pulley 54 is driven by a belt 55 from a suitable overhead power device (not shown).

Figure 2:
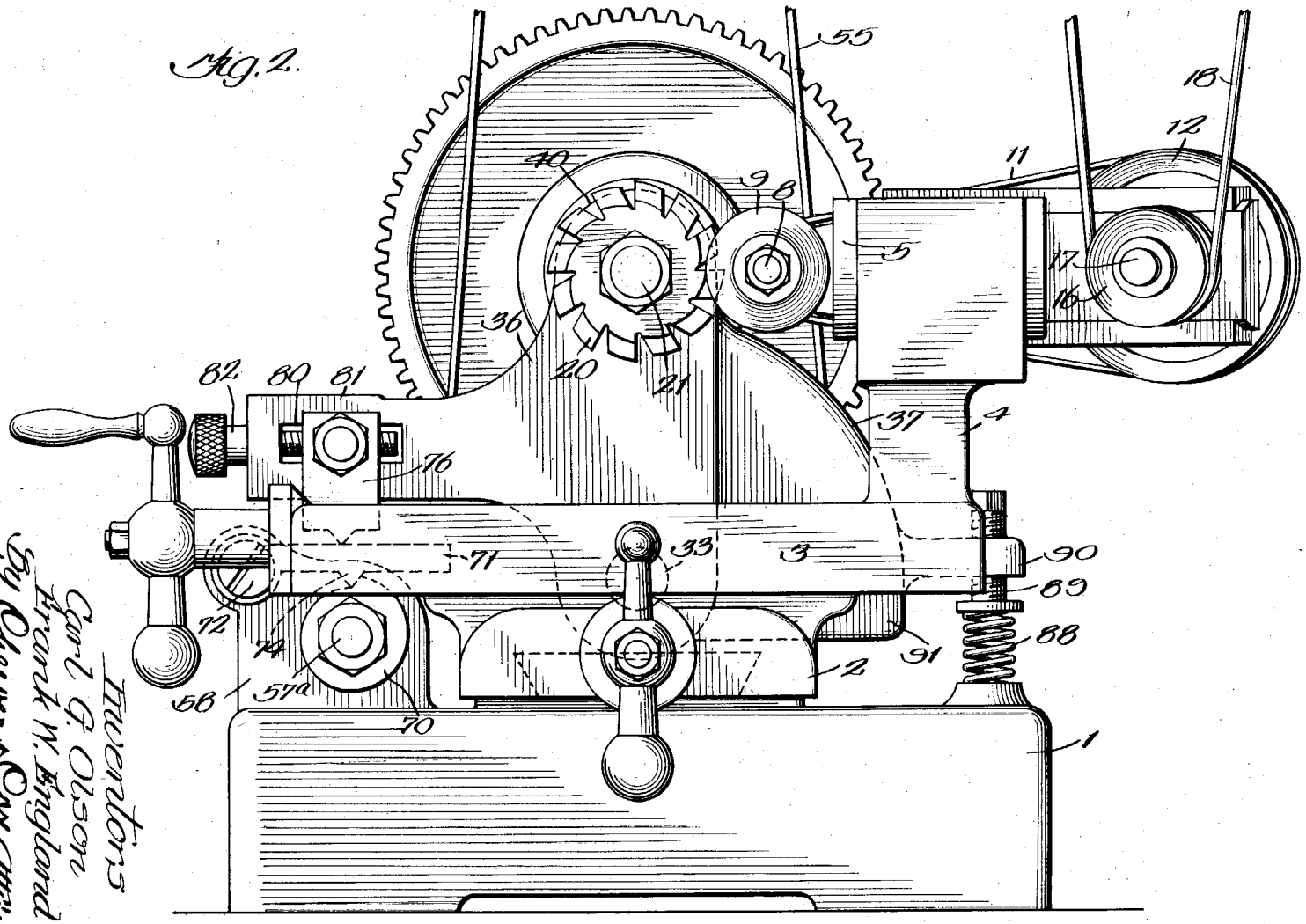
Figure 2 is an end elevation looking toward the left in Figure 1.
Figure 4:
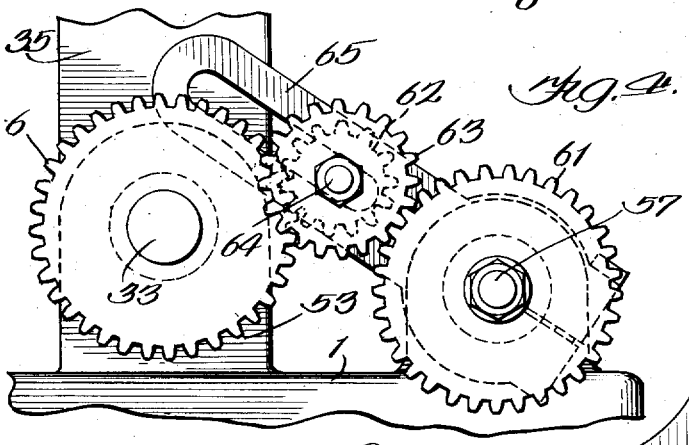
Figure 4 is an elevation of the change gears as viewed when looking in the direction of the arrow A, Figure 1.

Now referring particularly to the mechanism which oscillates the rocking frame 35, 36, 37—a cam shaft 57 is journaled in stationary bearings 58, 58 and is driven by change gears from the shaft 33. As shown in perspective in Figure 6 and in detail in Figure 4, a gear wheel 60 is fastened to shaft 33, a gear wheel 61 is fastened to shaft 57, and motion is transmitted from one to the other by intermediate gears 62, 63 which rotate as a single piece and mesh respectively with the wheels 60 and 61. These intermediate gears are supported upon a stud 64 adapted to be clamped in any suitable position upon a slotted arm 65 pivoted to shaft 57. By suitably selecting the intermediate pinions 62, 63 any desired speed ratio between shafts 33 and 57 may be obtained. Although it is not essential, it is desirable to form the cam shaft in two parts 57, 57ᵃ connected by a spring ratchet mechanism 68 shown in perspective in Figure 6. The function of the ratchet mechanism is to permit the section 57 of the shaft to rotate backward without rotating the section 57ᵃ backward. This ratchet has but a single tooth, as shown, and the result is that the two sections 57, 57ᵃ of the shaft will always occupy the same relative position when rotating forward, thus maintaining the timed relationship of the parts angularly and radially. This makes it possible to rotate the work spindle in a reverse direction to cause return travel of the work to original position so that the grinder may again pass over the work and this return travel can be accomplished without disturbing the proper timing between the rotary movement of the hob and its oscillatory or radial movement toward and from the grinder. Fastened to the section 57ᵃ of the cam shaft is a cam 70, the acting surface whereof is in the form of a spiral, thus forming a snail cam. Cooperating with the cam is an arm 71 pivoted upon a stationary fulcrum pin 72. The arm has a lug 74 on its underside which rests upon the cam with the result that as the cam rotates the arm 71 gradually rises and then suddenly falls. Riding upon the back or upper surface of the arm is a block 76 having a knife edge 77 for contacting the arm. The block is guided in a slot 80 arranged horizontally in the forward extension 81 of the arm 36 of the rocking frame. A screw 82, shown in side elevation in Figure 2, controls the position of the rider block lengthwise of the extension and thus controls the amount of throw of the rocking frame. By shifting the block away from pin 72 the throw will be increased and vice versa. As a result of this construction in which an intermediate arm 71 is interposed between the cam and the rocking frame, the movement produced by the cam may be magnified or diminished.

A helical compression spring 88 rests upon the bed 1 and supports a jack screw 89 screwing vertically in the lug 90 formed at the rear end of the rear extension 91 of the rocking frame. This serves to keep the rider block 76 in close contact with arm 71, and the latter in close contact with the cam 70.

In operation, when a hob is to be ground, the parts are assembled and adjusted as shown in the drawings and the machine is started. The driving belt 18 causes the grinding wheel to rotate at high speed, while the belt 55 causes the work spindle 24 to rotate and simultaneously move the hob forward in an axial direction in accordance with the helical lead or pitch of the hob teeth. The cam is also caused to rotate, which produces an oscillatory movement in the rocking frame and moves the hob gradually toward and suddenly away from the wheel axis. This conforms to the relief in the hob teeth and it will be understood that the parts are so geared that the cam will rotate as many times faster than the hob as there are teeth in a complete circumference of the hob. The grinding wheel not only rotates in a direction to throw the sparks downward, but the wheel itself is located at the back of the machine, or at least on the side of the hob away from the operator. Consequently, the operator may lean over toward the work without danger of coming into contact with the fast rotating grinding wheel. Furthermore, as the sparks are thrown downward there is no danger of their being thrown into the operator's eyes when he leans over to inspect the work. In addition, gravity assists in collecting the resulting dust and grit in an exhaust duct (not shown) which may be provided for conveying the same away from the machine.

After the wheel has ground one side of all of the hob teeth, the belt 18 is thrown off the sheave 16, whereupon the tool carrying frame 5 may be turned over about its horizontal axis 6 thus causing the acting surface of the tool to present the proper angle to grind the opposite side of the teeth. The hob is brought back to starting position again, with the grinding wheel engaging the opposite side of the hob teeth, whereupon the action may be repeated and the grinding finished.

It will be noted that the sheave or pulley 16 is so located in the tool carrier that the "on" side (shown at the right in Fig. 3) is substantially in line with the axis of the pivot which connects the tool carrier to the "tool". The advantage in this is that it enables the tool carrier to be turned over to reverse position without disturbing the relation of the sheave or pulley to the belt. In other words, the belt will run on to the pulley as well with the tool carrier in one position as it will with it in the reverse position.

It will be observed that according to the illustrated form the work spindle or work holder 21, 24 has three kinds of movement during ordinary operation of the machine, viz: It rotates, travels longitudinally and moves radially—that is, toward and from the grinder; also that the radial movement is caused by the oscillatory movement of the rocking frame. It will also be seen that the work spindle slides in its bearings in distinction to merely rotating in bearings formed in a traveling carriage. One advantage is that the lead screw does not have to drag unnecessary weight. It moves the work spindle and work and practically nothing else. Another is that the lead screw instead of being parallel to and at a distance from the axis of the work, as is the usual case where a lead screw is used to cause a work carriage to travel, the thrust or pull, that is, the operating force of the lead screw is practically in line with the resistance to travel or the point of application of the tool to the work. This makes for accurate work and a durable machine.

Having thus described the invention, what we claim as new and desire to secure by Letters Patent is:

1. In a relieving grinding machine for grinding hobs and taps, a rotating grinder, a work spindle which is rotatable, axially movable and transversely rockable, a non-traveling support in which the spindle is both rotatable and axially movable, said support being rockable transversely of the work spindle axis for producing bodily movement of the work toward and from the grinder, means for causing the work spindle to travel axially as it rotates to conform to the helical lead of the teeth on the work, a gear having an axis coincident with the axis of the work spindle for rotating the latter, and a pinion for rotating said gear, the axis of the pinion being coincident with the axis of oscillation of the work spindle and its support.

2. In a machine for grinding work having relieved teeth arranged helically, a rotating grinder, a work spindle which is rotatable, axially movable and transversely rockable, a non-traveling support in which the work spindle is both rotatable and axially movable, said work spindle supports being rockable transversely of the work spindle for producing relief in the work, a lead screw coaxial with the work spindle and rigidly fastened thereto, a non-traveling nut in which the lead screw works, the lead screw having the same pitch as the helical lead of the teeth of the work, a gear concentric with the work spindle for driving it, and a pinion for driving the gear, the axis of the pinion being parallel to and forming the axis of rocking of the work spindle and its driving gear.

3. In a hob grinder, a rotating grinder, a work spindle which is rotatable, axially movable and transversely movable, a non-traveling rocking frame in which the work spindle is both rotatable and axially slidable, said rocking frame being capable of oscillating in a plane transverse to the axis of the work spindle for moving the hob bodily toward and from the grinder for producing relief in the teeth, a lead screw having the same pitch as the lead of the hob teeth for causing the work spindle to travel axially as it rotates, a cam for rocking the frame, and gear connections between the cam and the lead screw for positively coordinating them.

4. In a hob grinding machine, a rotating grinder, a work spindle having a thread rigidly formed thereon of the same pitch as the lead of the hob, an oscillating frame for supporting the work spindle, a gear mounted on the work spindle for rotating it, means mounted in said frame and cooperating with the thread on the work spindle for causing axial movement thereof as the work spindle rotates, a pinion meshing with said gear and being coaxial with the axis of oscillation of said frame, and means for oscillating said frame in a plane transverse to the axis of the hob for producing relief in the hob.

5. In a hob-grinding machine, a rotating grinder, a work spindle having a thread of the same pitch as the lead of the hob, a non-traveling rocking frame for supporting the work spindle, means for rotating the work spindle, a nut mounted in the rocking frame and cooperating with the thread on the work spindle for causing axial movement thereof as the work spindle rotates, and means for oscillating said frame in a plane transverse to the axis of the hob for relieving the hob teeth.

6. A machine tool having a tool carrier, a tool spindle journaled in said carrier, a pulley for driving the tool spindle, a slide slidably mounted upon the tool carrier, a drive pulley journaled upon said slide, a belt for transmitting the motion of the drive pulley to the first mentioned pulley, and a spring for yieldingly forcing the pulleys apart to thereby keep the belt tight.

7. A machine tool having a tool post, a tool carrier pivoted to said post whereby the tool carrier is reversible, a tool spindle journaled in the tool carrier, and a pulley mounted upon the tool carrier and connected to the tool spindle for rotating it, the "on" side of the pulley being substantially in line with the axis of the pivot connection between the tool carrier and the tool post.

8. A hob grinder having a tool carrier, a tool spindle journaled in said carrier for rotating the grinding wheel, a work spindle for supporting the hob, means for rotating the hob spindle and simultaneously causing it to advance axially, a rocking frame wherein said work spindle is journaled, and a rotating cam adapted to rock the frame a plurality of times for every single rotation of the work spindle about its axis.

9. A hob grinder having a tool carrier, a tool spindle journaled in said carrier for rotating the grinding wheel, a work spindle for supporting the hob, means for rotating the hob spindle and simultaneously causing it to advance axially, a rocking frame wherein said work spindle is journaled, and a snail cam acting upon the rocking frame for moving the hob gradually toward the grinding wheel and suddenly away from it, the revolutions of the cam per minute being a multiple of the revolutions of the work spindle per minute.

10. In a hob grinding machine, a rotating grinder, a work spindle threaded in conformity with the lead of the hob, a gear connected to the work spindle concentrically therewith for rotating it, said gear and work spindle rotating always in unison, a lead nut in which the threaded portion of the work spindle journals, and means for oscillating the work spindle in a plane transverse to its axis for producing relief in the hob.

11. In a hob grinding machine, a rotating grinder, a work spindle, a rocking frame for supporting the work spindle, means for oscillating said rocking frame to bring the work toward and from the grinder for relieving the teeth on the work, the rocking frame being non-traveling and the work spindle being slidable axially in said frame to accommodate the lead of the hob, and means cooperating with the thread of the spindle for causing the spindle to move axially when it rotates.

12. In a hob grinding machine, a rotating grinder, a work spindle having formed on it a thread of the same pitch as the lead of the hob, an oscillating frame for supporting the work spindle, a gear mounted concentric with the work spindle for rotating it, means mounted in said frame and cooperating with the thread on the work spindle for causing axial movement thereof as the work spindle rotates, a pinion meshing with said gear and being coaxial with the axis of oscillation of said frame, and means for oscillating said frame in a plane transverse to the axis of the hob for producing relief in the hob.

13. In a hob grinding machine, a rotating grinder, a work spindle, means for causing radial movement between the grinder and the work spindle for relieving the hob teeth, means for causing relative travel between the grinder and the work spindle in an axial direction in conformity with the helical lead of the teeth in the hob, means for rotating the work spindle in timed relation with the aforesaid radial movement, and means whereby the rotary movement of the hob may be reversed to permit it to return to original position for a fresh operation without disturbing the timed relationship of the parts with respect to the angular position of the work spindle and its distance, radially, from the grinder.

14. In a hob grinding machine, a rotating grinder, a work spindle, means for causing radial movement between the grinder and the work spindle for relieving the hob teeth, means for causing relative travel between the grinder and the work spindle in an axial direction in conformity with the helical lead of the teeth in the hob, gearing for rotating the work spindle in timed relation with the aforesaid radial movement, and a one-toothed ratchet included in said gearing whereby the rotary movement of the hob may be reversed to permit it to return to original position and yet maintain its proper position angularly about its own axis and radially with respect to its distance from the grinder.

15. In a hob grinding machine, a rotating grinder, a hob spindle having an integral thread having the same lead as the hob, a gear mounted concentrically with the hob spindle for rotating it, a lead nut in which the threaded portion of the hob spindle works, a support for the hob spindle adapted to oscillate toward and from the grinder for producing relief in the hob, a gear concentric with the hob spindle for rotating it, and a pinion for driving the gear, the axis of the pinion being parallel to the axis of the work spindle and forming the center of oscillation for the work spindle and its support.

16. In a hob grinding machine, a rotating grinder, a hob spindle having an integral thread of the same lead as the hob, a non-traveling, oscillating support in which the hob spindle is journaled, a cam for rocking the support bodily toward and from the grinder for relieving the hob teeth, a non-traveling gear splined to the hob spindle concentrically with it for rotating it, a pinion for driving said gear, the axis of the pinion being coincident with the axis of oscillation of said support, a cam shaft for rotating the cam, and toothed gears for mechanically connecting the cam shaft and the first mentioned gear for causing the same to operate in synchronism.

17. In a hob grinding machine a rotating grinder, a work spindle, a lead screw rigidly fastened to the work spindle in line therewith, a non-traveling oscillating support in which the spindle and lead screw are journaled and in which they are longitudinally movable, a cam for oscillating the support toward and from the grinders for relieving the hob teeth, a non-traveling nut mounted in said support for causing the work spindle to move axially in conformity with the lead of the hob, a gear concentric with the work spindle for rotating it, and a pinion for driving the gear, the axis of the pinion being parallel to the axis of the work spindle and having an axis coincident with the axis of oscillation of said support.

18. In a hob grinding machine a rotating grinder, a hob spindle, a lead screw rigidly fastened to the hob spindle in line therewith and having the same lead as the hob teeth, a non-traveling oscillating support in which the spindle and lead screw are directly journaled, a pivot on which said support rocks to move the work toward and from the grinder for producing relief in the hob teeth, a non-traveling nut mounted in said support for cooperating with the lead screw, a gear concentric with the work spindle for rotating it, a pinion for driving said gear, the axis of the pinion being coincident with the axis of oscillation of said support, and means rotating in timed relation with said pinion for oscillating said support about its axis.

19. A hob grinder, a grinding wheel rotating in place, a hob spindle, a lead screw rigidly fastened to the hob spindle in line therewith, a non-traveling support in which the spindle is directly journaled, a non-traveling nut cooperating with the lead screw, a non-traveling gear having a splined connection with the hob spindle for rotating it and permitting it to travel, a shaft on which the support is mounted, a rotating cam for rocking said support to move the hob toward and from the grinder, a non-traveling pinion fastened to said shaft for rotating said gear, the gear being mounted on said support and rocking therewith, and gear connections between said pinion and said cam for rotating them in timed relation with each other.

CARL G. OLSON.
FRANK W. ENGLAND.